United States Patent [19]

Leenders

[11] 4,353,863
[45] Oct. 12, 1982

[54] METHOD FOR LOCALIZING A LEAKING ROD IN A NUCLEAR FUEL ASSEMBLY

[75] Inventor: Léon G. Leenders, Mol, Belgium

[73] Assignee: Centre d'Etude de l'Energie Nucléaire, C.E.N., Brussels, Belgium

[21] Appl. No.: 165,812

[22] Filed: Jul. 3, 1980

[30] Foreign Application Priority Data

Jul. 6, 1979 [FR] France .................. 79 17579

[51] Int. Cl.³ .............................. G21C 17/00
[52] U.S. Cl. .................................... 376/251
[58] Field of Search ............... 250/303; 376/251, 253, 376/450

[56] References Cited

U.S. PATENT DOCUMENTS

| | | | |
|---|---|---|---|
| 2,777,812 | 1/1957 | Powell et al. | 376/251 |
| 3,146,171 | 8/1964 | Donguy et al. | 376/251 |
| 3,177,121 | 4/1965 | Horowitz et al. | 376/251 |
| 3,813,286 | 5/1974 | Goldman et al. | 376/251 |
| 3,975,949 | 8/1976 | Johnson et al. | 376/251 |

FOREIGN PATENT DOCUMENTS 1383186 11/1964 France .
2085843 12/1971 France .
2302572 9/1976 France .
1499133 1/1978 United Kingdom .

OTHER PUBLICATIONS

EUR 5289 e (1974), Adiletta et al., Investigations on Radioactive Fission Product Correlations; Gamma Spectrometry Measurements on Spent Fuel Assemblies of the Garigliano Reactor.
Nuclear Instr. & Meth., 154 (1978), pp. 41–51, Michel, North Holland Publishing Co.

Primary Examiner—Sal Cangialosi
Attorney, Agent, or Firm—Sughrue, Mion, Zinn, Macpeak and Seas

[57] ABSTRACT

There is described a method for localizing a leaking rod from a nuclear fuel assembly, in which for each rod in an assembly, the radio-activity in at least two discrete rod rows in which said rod lies is measured and a leaking rod is localized by sensing a lowering of the radio-activity in the tested rows where said rod lies relative to the radio-activity in an identical row of non-leaking rods.

There is further described an equipment for the working of this method.

24 Claims, 6 Drawing Figures

METHOD FOR LOCALIZING A LEAKING ROD IN A NUCLEAR FUEL ASSEMBLY

This invention relates to a method for localizing a leaking rod in a nuclear fuel assembly, notably an irradiated assembly.

Nuclear fuel is generally in the shape of sealed tubes enclosing a pellet stacking, and one or a plurality of plenums for collecting the gaseous fission products which are released from the pellets during the nuclear reactor operation.

Said tubes which are called "rods" in this description, are assembled in clusters according to a regular array with a square or triangular geometry for instance, the whole unit forming a rod assembly.

Under producing conditions, the nuclear reactor is stopped regularly to unload part of the assemblies, the most used ones, and replace same by green assemblies.

For various reasons some rods may lose the tightness thereof during the reactor operation. Said rods then release radio-active fission products the accumulation of which in the primary cooling circuit of the reactor would cause the access thereto to be more and more difficult.

This is one reason why the users of nuclear power plants perform an overhauling of said assemblies as they are removed from the reactors, notably when the radio-activity of the primary circuit thereof exceeds some predetermined standards. During such overhauling the leaking assemblies are separated from the safe assemblies. By "leaking assemblies" is thus meant such assemblies as defined above at least one rod of which does not have the required tightness.

So-called "wet sipping" or "dry sipping" sweating methods are generally used to perform such an overhauling. Such methods are well known, notably from French Pat. Nos. 2,389,202 and 4,147,587. The assembly to be overhauled is arranged under such conditions that the contaminating by the radio-active gaseous fission products, of that water or gas which has directly contacted said rods, may be measured either by having said water or air pass a radiation detector, or by drawing gas or water samples in which the radio-activity is measured.

As a rule the leaking assemblies even as they are not completely spent, are not loaded back in the nuclear reactor. Consequently the presence of a leaking rod may penalize a complete assembly, that is about 300 rods in a PWR-type reactor ("pressurized water reactor"), about 50 rods in a BWR-type reactor ("boiling water reactor"), and about 250 rods in a FBR-type reactor ("fast breeder reactor").

The presence of such leaking rods in some assemblies has thus a substantial financial influence on the operating costs of a nuclear power plant.

Another problem which is perhaps of less financial importance but which will cause heavier and heavier safety restraints in the future, is the conveying of leaking assemblies and the receiving thereof in retreatment works.

One essential object of this invention is to provide a method allowing to obviate the drawbacks which have been sketched above.

For this purpose according to the invention, for each rod in an assembly, the radio-activity in at least two discrete rod rows in which said rod lies is measured and a leaking rod is localized by sensing a varying of the radio-activity in the tested rows where said rod lies relative to the radio-activity in an identical row of non-leaking rods.

In a preferred embodiment of the invention, the radio-activity of the gaseous fission products accumulated in the rod plenum(s) is measured. Advantageously the γ-radiation generated by said fission products is measured, but according to the invention, the method may also be applied when adding gaseous radio-active tracers, and in such a case the γ-radiation generated by such tracers is measured.

Said latter method is generally applied for a single rod (U.K. Pat. No. 1,499,113 and Belgian Pat. No. 640,220).

The invention also pertains to an equipment for the working of the above method which comprises at least one radio-activity sensor arranged behind such a collimator that only the rod plenums lie in the viewing area of the sensor.

In a particular embodiment according to the invention, the sensor and the assembly are so mounted as to be movable relative to one another along a direction substantially at right angle to the rod axis.

Other details and features of the invention will stand out from the following description given by way of non limitative example and with reference to the accompanying drawings, in which.

In the various figures, the same reference numerals pertain to similar components.

The method for localizing according to the invention, a leaking rod in a nuclear fuel assembly generally lies in measuring for each rod in said assembly, the radio-activity, notably the γ-activity, from at least two discrete rod rows in said assembly, in which rows lies said rod, and localizing a possible leaking rod by sensing a varying of said radio-activity in the tested rows where said rod is located, relative to the radio-activity in an identical row of non-leaking rods.

In a particular embodiment of the invention, use may advantageously be made of the change in the ratio between two or more radio-active products (fission products, activating products, or tracers).

More particularly the radio-activity of the gaseous fission products, activating products, or radio-active tracers accumulated inside the rod plenum(s) is measured, said rods being arranged either inside a desactivating tank containing a cooling medium (water, sodium, etc), or inside a cased cell.

FIGS. 1 to 5 show a particular embodiment of said method.

Figure 1:
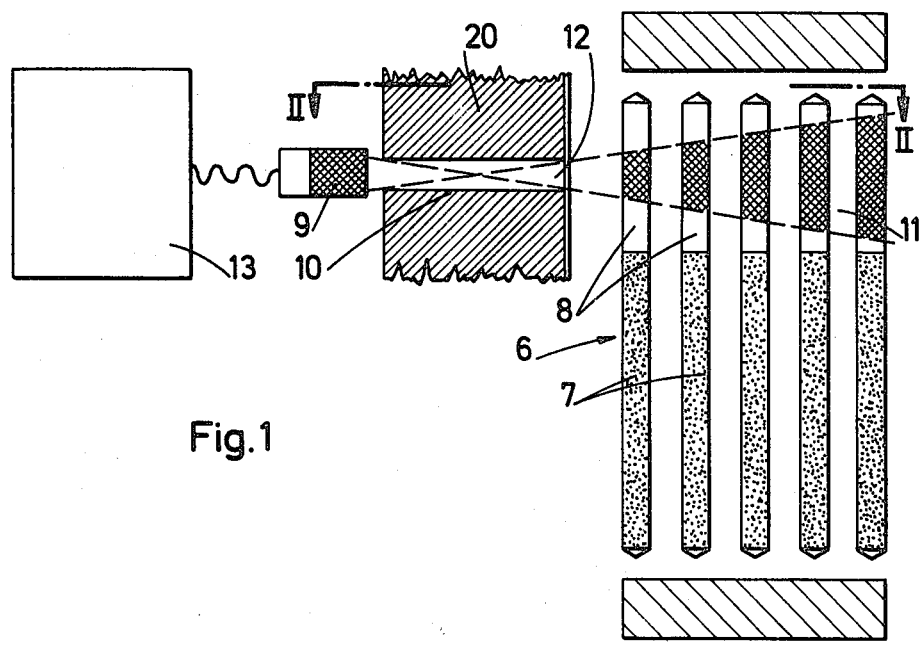
FIG. 1 is a diagrammatic elevation view of a particular embodiment of a method and the corresponding equipment for the localizing of a leaking rod inside a nuclear fuel assembly.

FIG. 1 shows diagrammatically an assembly 6 from five rows A, B, C, D and E of rods containing a fissionable material 7 topped by a plenum 8 inside which are collected fission products which are released by the fissionable material during the operation of a nuclear reactor.

Said rods are assembled into clusters according to a regular array with a square geometry, the assembly means however have not been shown in the drawings.

Among the fission products accumulated inside the plenum, some products are radio-active and generate $\gamma$-radiations.

Such radiations with high energy, for example larger than 500 keV, easily pass through the structural materials of the assembly at the level of plenums 8.

A $\gamma$-radiation sensor 9 suitably protected from the surrounding radiations, is arranged behind a collimator 10 with such a size that only the plenums from a single rod row at a time can lie wihtin the viewing field 11 of sensor 9. Said sensing or viewing field 11 has a pyramidal shape mostly spread along the rod axis as clearly shown in FIGS. 1 to 3. Consequently the sensitivity loss in the measuring of the $\gamma$-radiations due to the spacing of some rods, is at least partly balanced by such pyramidal shape of the radiation beam captured by the sensor and forming said viewing area 11. Indeed the more some particular rod is spaced away, the larger is the plenum cross-section area lying inside the viewing area 11.

Advantageously, the solid angle from the collimator is so selected as to approximately balance the losses by $\gamma$-absorption. It would be possible in this respect to adjust the size of slot 12 from collimator 10 along the rod axis.

As regards the width of said slot 12, said width is enforced by the activity to be measured and the statistical accuracy. Said width will preferably be substantially smaller than the rod outside diameter to eliminate edge effects such as rod sag, centering of a spring not shown, etc.

The $\gamma$-radiation sensor 9 comprises for instance a crystal from NaI, Ge(Li), intrinsic Ge, Cd.Te, HgI$_2$, . . . . Said sensor is connected to a meter 12 which is for example comprised of a recording device for the total activity, or a device for discriminating $\gamma$-radiations with energies corresponding to well-characterized fission products, for instance by means of a monochannel device, a multi-channel device, etc. The selection of the measuring method is essentially dependent on the actual working conditions such as the irradiating time, the cooling time, etc.

Figure 2:
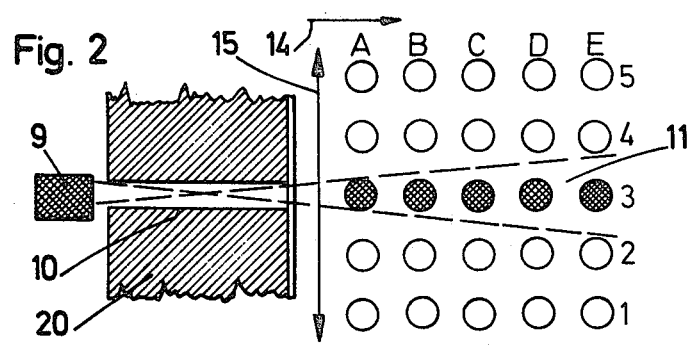
FIG. 2 is a diagrammatic plan view along line II—II in FIG. 1.
Figure 3:
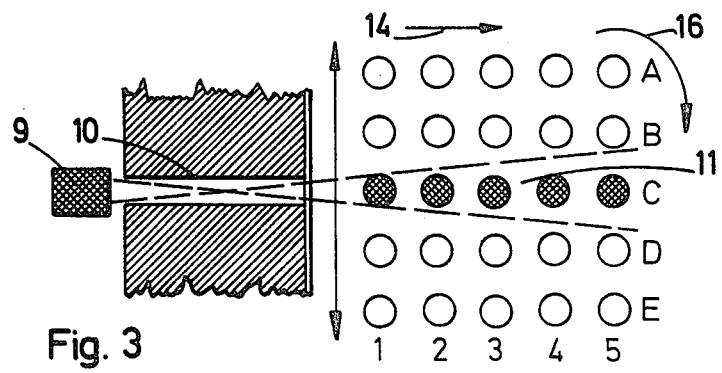
FIG. 3 is also a diagrammatic plan view in which however the rod assembly has been rotated over a 90°-angle about a vertical axis.

FIGS. 1 to 3 show an actual example of localizing a leaking rod. Said method comprises measuring discretely and succeedingly the $\gamma$-activity from rows 1 to 5 in assembly 6 extending along the direction of arrow 14 by subjecting for instance said assembly to a translating along the direction shown by arrows 15 in such a way that plenums 8 from the rods in each such rows 1 to 5 pass through the viewing area 11 from collimator 10.

Thereafter, said rod assembly 6 is rotated over a 90°-angle about an axis in parallel relationship with the rods as shown by arrow 16 in FIG. 3, in such a way that the rods lie in that position relative to collimator 10 which is shown in FIG. 3.

In a similar way, the $\gamma$-radiation from each row A to E extending in the direction of arrow 14 is measured by subjecting rod assembly 6 to a translating in the direction of arrows 15 relative to collimator 10.

Said translating may be a continuous or stepwise motion.

Figure 4:
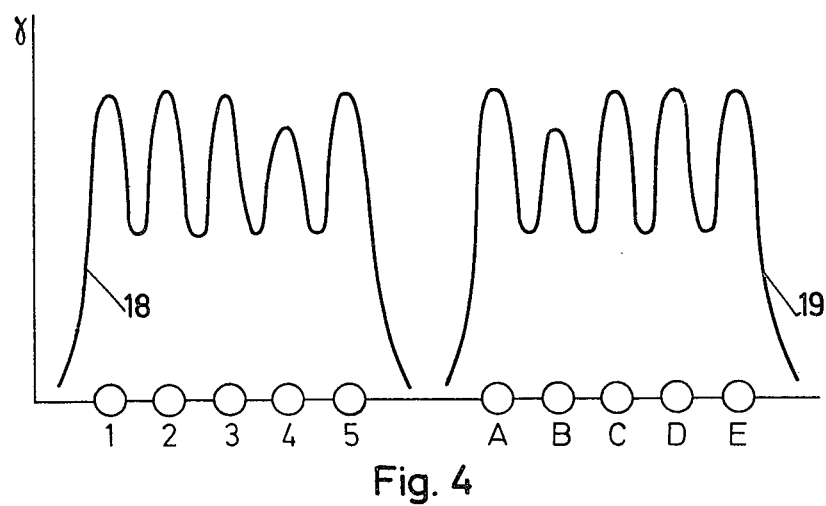
FIG. 4 is a diagram showing the γ-activity of two series of rod rows at right angle to one another in an assembly.

In the case of a continuous translation the measuring of $\gamma$-activity may be plotted in a diagram as shown in FIG. 4. The $\gamma$-activity is plotted in ordinates, while the motion of said rod assembly relative to collimator 10 is plotted as abcissas.

For clearness' sake, the markings of rows 1 to 5 and A to E have been shown along the abcissa axis.

Diagram 18 shows the measuring as performed according to FIG. 2, while diagram 19 shows the measuring as performed according to FIG. 3.

When assuming for example that said assembly comprises a single leaking rod in position B4, the $\gamma$-activities from rows 4 and B which contain said rod, will show a change in the $\gamma$-activity which is for example, as shown in FIG. 4, a lowering of said $\gamma$-activity. Moreover it is also possible by computing, to ascertain a varying of the ratio relative to one or more radio-active products.

Figure 5:
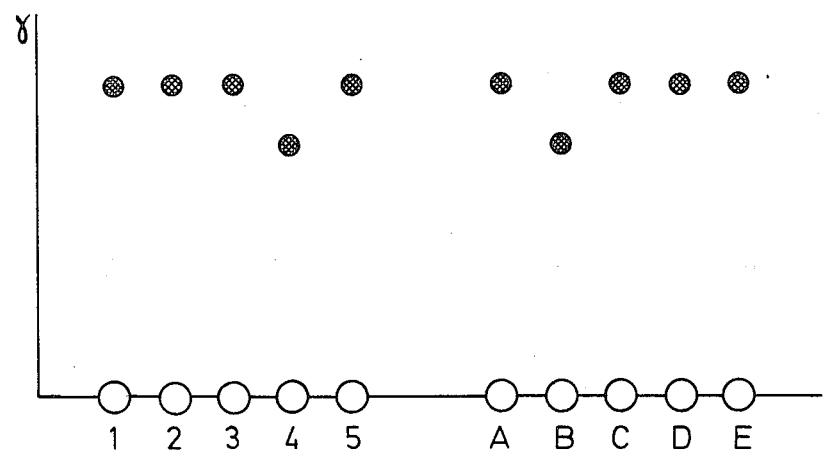
FIG. 5 is another diagram of the γ-activity of two series of rod rows at right angle to one another.

The $\gamma$-activity measurings performed in the case of a stepwise translating have been shown in the diagram from FIG. 5 which also enables to localize directly the leaking rod B4.

In the case of a stepwise translating, the spacing between two succeeding steps should be substantially equal to the spacing between the axial planes of two succeeding rod rows in said assembly.

In the case of a translating and rotating of a rod assembly 6, the sensor may be fixed and in this case, the collimator can be provided in wall 20 of the storage or desactivating tank, or of the cased cell which contains said assembly at the level of rod plenums 8. Said wall then comprises essentially the $\gamma$-protection for sensor 9.

However in the case where for instance said collimator could not be provided in the wall for practical considerations, in a variation of the method for localizing a leaking rod according to the invention, it would be possible to provide for the translating of that unit formed by collimator 10, sensor 9 and a specific protection thereof against the surrounding radiations. In such a case said unit may for instance cooperate with a mechanism not shown in the figures for translating said unit inside the desactivating or storage tank, or inside the cased cell, for example along the inner surface of the wall 20 thereof. It is thus required in the case of a square array as shown in FIGS. 2 and 3, that said unit may perform two translation motions at right angle to one another along a substantially horizontal direction on the outer side from said rod assembly.

Said unit might even be immersed into the cooling medium which is contained inside said tank.

The translating of the assembly might however be combined with the translating of the sensor-collimator unit.

In such an embodiment the movement of the rod assembly might for example be limited to a simple rotating about an axis in parallel relationship with the rods and the translating of a sensor-collimator unit might be limited to a single direction.

In another embodiment, it would be possible to provide a co-ordinated rotating of the assembly and the sensor-collimator unit.

Should the rod array have a triangular geometry said rotating of the assembly might be limited to 60° instead of 90°, while in the case of a fixed assembly, the angle formed between both translations of the movable sensor-collimator unit should also be 60°.

For large-volume assemblies, the share of one rod in the activity of a row is progressively lowered together with the increasing spacing due to the γ-absorption in the structural materials and possibly in the cooling medium. The measuring along four sides for an assembly with square geometry or along six sides for an assembly with triangular geometry allows to confirm the results obtained over two sides, as a rod far away from the one side is close relative to the opposite side.

On the other hand, it may be advantageous to perform the measuring over rows in parallel relationship with the diagonals for an assembly with square geometry.

However as already mentioned above, the sensitivity loss due to the spacing away of a specific rod can be balanced partly at least by means of the pyramid-shaped viewing field for the collimator.

When the γ-absorption in the cooling medium results in too much lowering of the share from the last rods, the sensitivity lowering due to such absorption might be removed by discharging temporarily the cooling medium from the area of those rods to be subjected to radio-activity measuring, that is from the plenums 8.

Moreover when the leaking of gaseous fission products from the leaking rod is too small for the localizing to be unquestionable, it would be possible to provide heating of the assembly when measuring said activity or between two activity measurings, to cause a stronger leak which is thus easier to localize.

It is further to be noted that the example of localizing as shown diagrammatically in FIGS. 4 and 5 assumes a simple assembly the rods of which are spent uniformly. Actually however, said assemblies may contain empty rods such as RCC control rods, a stacked implementing, etc., which form irregularities at the start. Moreover the rods are not generally spent uniformly, which does of course contribute to an unequal distributing of the activities.

For a given assembly type and reactor, there is but little difference from one assembly to another, in such a way that the results may be related to a typical assembly, which is not leaking, to remove the action of said irregularities.

It is also possible to minimize the influence of said irregularities or the influence of a position uncertainty, by referring the measured activity to a fission or activating product which is not influenced by the leak.

As already mentioned above, the invention further relates to an equipment for localizing a leaking rod in a nuclear fuel assembly.

There already results from the above description relating to the method for localizing such a rod that such equipment does comprise an enclosure (storage or desactivating tank, or cased cell) which contains partly at least a rod assembly, and at least one γ-radiation sensor which is arranged behind a collimator with such a size that only the rod plenums lie within the sensing or viewing area of the sensor.

Figure 6:
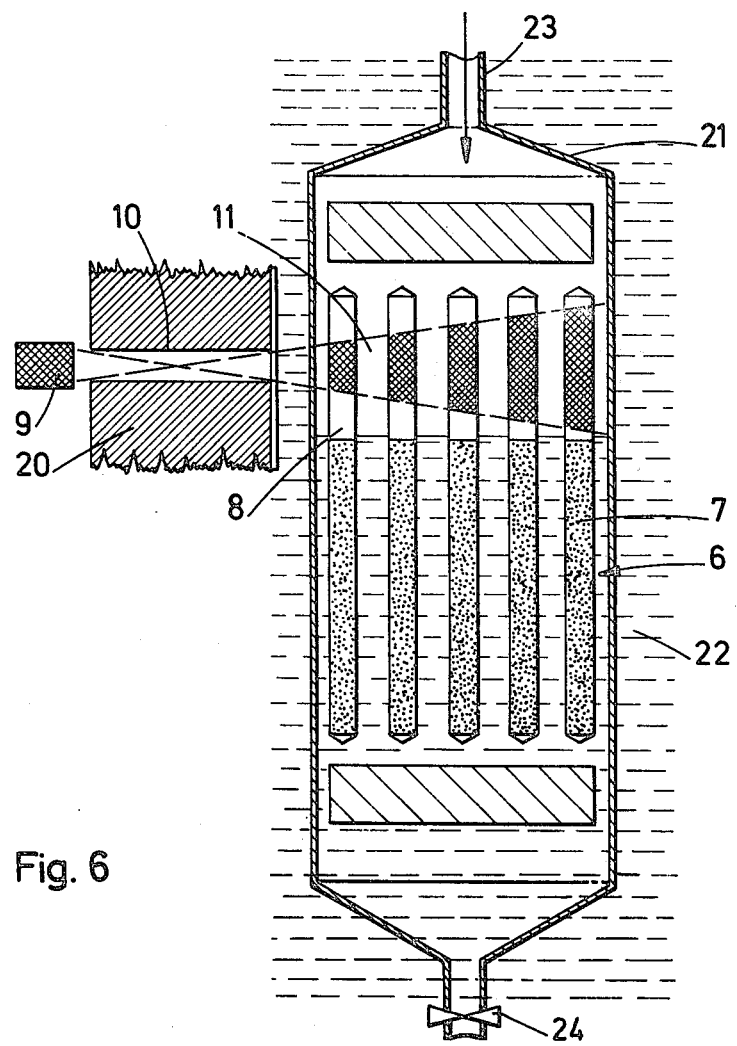
FIG. 6 is a diagrammatic vertical section view with parts broken away, of a particular embodiment of an equipment for localizing leaking rods in a nuclear fuel assembly.

FIG. 6 shows a particular embodiment of a part from such an equipment.

Said embodiment comprises a cylinder 21 which can be arranged above rod assembly 6 and dipped partly at least in the cooling medium 22 inside the desactivating or storage tank, part of the γ-protection being shown where collimator 10 and sensor 9 are provided. Said cylinder is connected through the top thereof, to a pressurized gas source not shown, by means of a line 23, to allow forcing the cooling medium underneath said cylinder to a level lower than said viewing or sensing area 11 to lower the γ-absorption.

This would enable a better sensing of leaking rods the fission product loss of which is relatively small. Moreover with a greater lowering of the cooling medium level inside the cylinder, there would be obtained a better sensing of leaking rods the fission product loss of which is relatively small. The temporary absence of cooling medium at the level of the fissionable material would make easier the γ-heating inside the assembly as well as the release of fission products from said leaking rods.

In a particular embodiment of the equipment inside a cased cell, the same result could be obtained by heating said assembly.

The temporary closure of a lower valve 24 and depressurizing of the cylinder might further increase the release efficiency of the fission products.

It must be understood that the invention is in no way limited to the above embodiments and that many changes may be brought therein without departing from the scope of the invention as defined by the appended claims.

For instance it would be possible to provide a plurality of sensors for one and the same rod assembly and even one sensor per row the activity of which is to be measured. In such a case, both the sensors and the rods might remain fixed.

According to the invention, said embodiment with a plurality of sensors might be included in the above-mentioned sweating equipment.

Moreover, it must be understood that the invention is not limited to the top plenum given as example hereinbefore, but may apply to those various plenums the assembly to be tested might comprise, whatever the level thereof.

As already mentioned above, in some cases it is possible to measure the radio-activity from tracers arranged inside the rods when manufacturing same, said tracers either being originally radio-active notably for manufacture control, or being activated by neutron irradiating.

Advantageously the rods can be taken-apart inside the assemblies to allow replacing easily the leaking rods.

I claim:

1. Method for localizing a leaking rod inside a nuclear fuel assembly, in which for each rod in an assembly, the radio-activity in at least two discrete rod rows in which said rod lies is measured and a leaking rod is localized by sensing a lowering of the radio-activity in the tested rows where said rod lies relative to the radio-activity in an identical row of non-leaking rods.

2. Method as defined in claim 1, in which the radio-activity of the fission products accumulated in the rod plenum is measured.

3. Method as defined in claim 1, which comprises measuring the radio-activity from a tracer added to said rods during the manufacturing thereof.

4. Method as defined in claim 1, which comprises making use of a change in the ratio between two or more radio-active products to localize said leaking rods.

5. Method as defined in claim 1, in which the γ-radiation generated by said fission products is measured.

6. Method as defined in claim 1, which comprises measuring the radio-activity at the level of the rod plenums.

7. Method as defined in claim 1, which further comprises measuring the radio-activity of assembly rods inside a desactivating or storage tank which contains a cooling medium, or inside a cased cell.

8. Method as defined in claim 1, in which the cooling medium is discharged from the area of those rods to be subjected to radio-activity measuring.

9. Method as defined in claim 1, in which use is made of releasable assemblies to allow replacing said leaking rods.

10. Method as defined in claim 1, which further comprises subjecting a radiation sensor and a rod assembly to a relative displacement along a cross-wise direction, preferably substantially at right angle to the rod axis, to allow measuring with said sensor, the radio-activity from one rod row at a time.

11. Method as defined in claim 10, in which said displacement is comprised of a continuous translating of the assembly and/or sensor.

12. Method as defined in claim 10, in which said displacement is comprised of a stepwise translating over a distance which is substantially equal to the spacing between the axial planes of two succeeding rod rows in said assembly along a cross-wise direction, preferably at right angle to the rod axis.

13. Method as defined in claim 10, in which said displacement is comprised of a co-ordinated rotating of said rod assembly and said sensor.

14. Method as defined in claim 1, in which one sensor is used for every rod row, said sensors being aligned with the rods along one or more side surfaces from said assembly.

15. Method as defined in claim 1, which further comprises heating or letting the rods get heated before said radio-activity measuring.

16. Method as defined in claim 1, which comprises generating an underpressure around said rods.

17. Equipment for localizing a leaking rod inside a nuclear fuel assembly, notably for the working of the method as defined in claim 1, which comprises a tank enclosing a cooling medium into which dips partly at least a rod assembly, and at least one radio-active radiation sensor arranged behind a collimator with such a size that only the rod plenums lie in the sensing or viewing area of said sensor(s).

18. Equipment as defined in claim 17, in which the sensor and the assembly are so mounted as to be movable relative to one another along a cross-wise direction, preferably at right angle to the rod axis.

19. Equipment as defined in claim 17, in which said collimator is provided in the side wall of the tank or cell, facing the plenums from the assembly rods.

20. Equipment as defined in claim 17, in which the unit formed by the sensor and the collimator is immersed inside the tank.

21. Equipment as defined in claim 17, in which said collimator is provided facing the sensor, with a slit the width of which is smaller than the outer rod diameter, for example about 80% thereof.

22. Equipment as defined in claim 17, which further comprises a cylinder to be arranged above the rod assembly and dipped partly at least into the tank cooling medium, said cylinder being connected through the top thereof, to a pressurized gas supply to allow forcing the cooling medium away.

23. Equipment as defined in claim 22, in which said cylinder is open at the bottom thereof, can be arranged above the rod assembly and can dip partly at least into the tank cooling medium.

24. Equipment as defined in claim 22, in which said cylinder is connected through the top thereof to a pressurized gas supply or a vacuum pump, and it is provided at the bottom thereof with closing means.

* * * * *